US008898967B2

(12) United States Patent
Bartelt-Muszynski

(10) Patent No.: US 8,898,967 B2
(45) Date of Patent: Dec. 2, 2014

(54) FIXTURE FOR SOLAR MODULES

(75) Inventor: Sven Bartelt-Muszynski, Schwedt (DE)

(73) Assignee: Sapa Holding GmbH, Offenburg (DE)

( * ) Notice: Subject to any disclaimer, the term of this patent is extended or adjusted under 35 U.S.C. 154(b) by 1439 days.

(21) Appl. No.: 12/593,009

(22) PCT Filed: Feb. 26, 2008

(86) PCT No.: PCT/DE2008/000370
§ 371 (c)(1), (2), (4) Date: Nov. 30, 2009

(87) PCT Pub. No.: WO2008/119316
PCT Pub. Date: Oct. 9, 2008

(65) Prior Publication Data

US 2010/0083954 A1 Apr. 8, 2010

(30) Foreign Application Priority Data

Mar. 30, 2007 (DE) ......................... 10 2007 016 047
Mar. 30, 2007 (DE) ..................... 20 2007 004 894 U

(51) Int. Cl.
*E04D 13/18* (2014.01)
*F24J 2/52* (2006.01)
*H01L 31/042* (2014.01)

(52) U.S. Cl.
CPC ................ *F24J 2/5258* (2013.01); *Y02E 10/47* (2013.01); *F24J 2/5203* (2013.01); *Y02E 10/50* (2013.01); *H01L 31/0422* (2013.01)
USPC ........................... 52/173.3; 136/251; 248/500

(58) Field of Classification Search
CPC ......... F24J 2/5203; F24J 2/5258; F24J 2/045; H01L 31/422; H01L 31/0482; Y02E 10/12; Y02E 10/20; Y02E 10/47; Y02E 10/50
USPC ........... 248/500, 237; 136/230; 126/704, 623; 52/173.3, 58, 745.21
See application file for complete search history.

(56) References Cited

U.S. PATENT DOCUMENTS 6,370,828 B1 * 4/2002 Genschorek .................... 52/200
6,959,517 B2 * 11/2005 Poddany et al. ............. 52/173.3

(Continued)

FOREIGN PATENT DOCUMENTS

DE 202004015811 U1 12/2004
DE 202005001469 U1 4/2005

(Continued)

*Primary Examiner* — Terrell McKinnon
*Assistant Examiner* — Daniel Breslin
(74) *Attorney, Agent, or Firm* — Patent Central LLC; Stephan A. Pendorf

(57) ABSTRACT

Disclosed is a fixture for external frame sections (1) of solar modules on a profiled support (2). Said fixture comprises a clamping piece support (3) which can be moved in a guided manner on the profiled support (2) in the longitudinal direction of the profiled support (2) and can be braced with the profiled support (2) so as to enclose a frame section (1) of the solar module and a clamping piece (4) that is guided within the clamping piece support (3). The clamping piece (4) is designed as a double-angled profiled element which has legs (4.1, 4.2) extending in opposite directions. The upper leg (4.1) embraces the frame section (1) of the solar module while the lower leg (4.2) is disposed in and on the clamping piece support (3) so as to be vertically adjustable in a guided manner in the moving direction (7).

17 Claims, 3 Drawing Sheets

4.3 4.1 12 7 1 3 5 9 9 2 17 4.2

(56) References Cited

U.S. PATENT DOCUMENTS

| | | | | |
|---|---|---|---|---|
| 7,297,866 | B2 * | 11/2007 | Aschenbrenner | 136/246 |
| 7,434,362 | B2 * | 10/2008 | Liebendorfer | 52/173.3 |
| 7,634,875 | B2 * | 12/2009 | Genschorek | 52/173.3 |
| 7,915,519 | B2 * | 3/2011 | Kobayashi | 136/251 |
| 7,956,280 | B2 * | 6/2011 | Kobayashi | 136/251 |
| 8,039,733 | B2 * | 10/2011 | Kobayashi | 136/251 |
| 8,413,944 | B2 * | 4/2013 | Harberts et al. | 248/500 |
| 8,453,986 | B2 * | 6/2013 | Schnitzer | 248/237 |
| 8,479,458 | B2 * | 7/2013 | Morita et al. | 52/173.3 |
| 8,495,839 | B2 * | 7/2013 | Tsuzuki et al. | 52/173.3 |
| 8,595,996 | B2 * | 12/2013 | Korman et al. | 52/173.3 |
| 8,640,400 | B2 * | 2/2014 | Liebendorfer | 52/173.3 |
| 8,650,812 | B2 * | 2/2014 | Cusson | 52/173.3 |
| 8,701,361 | B2 * | 4/2014 | Ferrara | 52/173.3 |
| 8,733,027 | B1 * | 5/2014 | Marston et al. | 52/24 |
| 2004/0221524 | A1 * | 11/2004 | Poddany et al. | 52/204.5 |
| 2006/0086382 | A1 * | 4/2006 | Plaisted | 136/244 |
| 2006/0156651 | A1 * | 7/2006 | Genschorek | 52/200 |
| 2007/0131273 | A1 * | 6/2007 | Kobayashi | 136/251 |
| 2008/0000173 | A1 * | 1/2008 | Lenox et al. | 52/173.1 |
| 2008/0110493 | A1 * | 5/2008 | Aschenbrenner | 136/251 |
| 2010/0154784 | A1 * | 6/2010 | King et al. | 126/623 |
| 2010/0293874 | A1 * | 11/2010 | Liebendorfer | 52/173.3 |
| 2012/0073219 | A1 * | 3/2012 | Zuritis | 52/173.3 |
| 2012/0102853 | A1 * | 5/2012 | Rizzo | 52/173.3 |

FOREIGN PATENT DOCUMENTS

| | | | |
|---|---|---|---|
| DE | 102005001654 | B3 | 4/2006 |
| DE | 202006009871 | U1 | 11/2006 |
| DE | 202006013261 | U1 | 11/2006 |
| EP | 1647782 | A2 | 4/2006 |
| EP | 1767719 | A2 | 3/2007 |
| WO | 03098126 | A | 11/2003 |

* cited by examiner

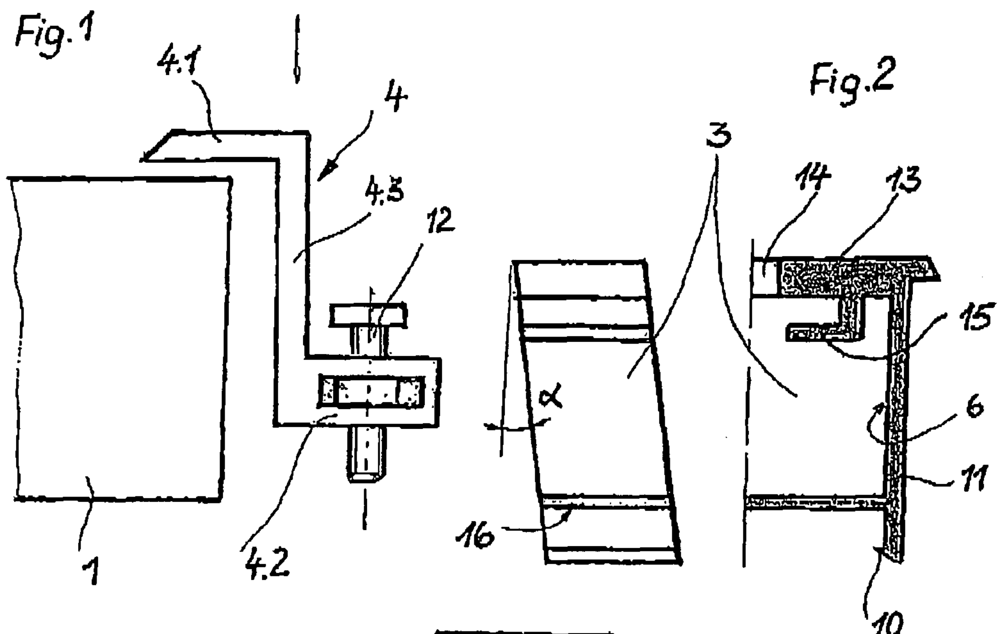
Fig. 1
4.1
4
4.3
12
4.2
1
3
α
16
Fig. 2
14
13
15
6
11
10
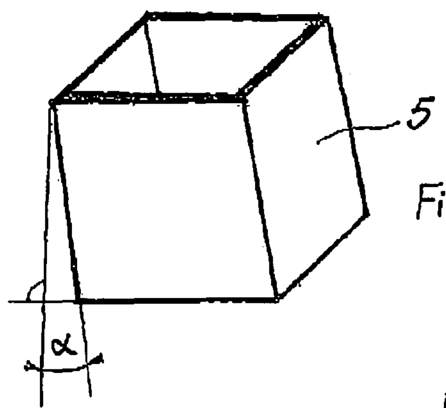
5
Fig. 4
α
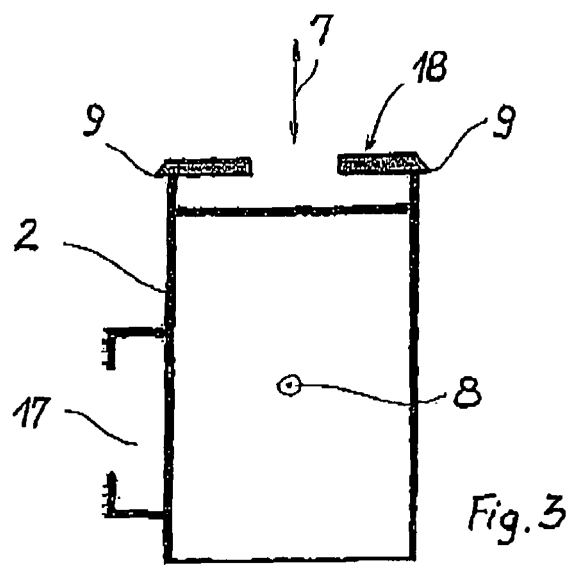
7
18
9
9
2
8
17
Fig. 3

FIXTURE FOR SOLAR MODULES

The invention relates to a fixture for the external frames of solar modules, in particular in portions where the ends of the supporting profiles are located.

When fixing solar module frames of adjacent solar modules to a mounting profile, one uses clamping pieces or clamping washers that are centrically connected to the mounting profile by means of a fastener and simultaneously press the frames onto the mounting profile from above.

This technique fails at the outer edge of several adjacent solar modules since only one solar module frame is available as a rest for the clamping piece. Therefore, spacers or similar means are arranged in addition in place of the missing frame in order to achieve a symmetrical rest for the clamping piece. Since this is not only costly, but also optically unattractive, additional covering is provided, for example by means of angular inserts.

Further, a fixture for external frame portions of solar modules in the end portion of supporting profiles is known from DE 20 2006 013 261.9. The end portion of the supporting profiles here has a cross-section with an open region into which an expanding insert is insertable that is connectable, on the face of the supporting profile, to one leg of an L-shaped end piece, wherein, when the connection between the end piece and the expanding insert is established, a clamping effect is achieved in the supporting profile as a result of the expansion of the expanding insert. The other L-leg reaches over the top of the solar module frame and causes, when the connection between the end piece and the expanding insert is established, the frame of the solar module to be pressed against the supporting profile.

It has turned out that this fixture requires a high dimensional accuracy of the module frames and of the stand, which dimensional accuracy is difficult to meet.

On the basis of this state of the art, it is the object of the invention to make an end fixture possible that is easy to assemble and optically attractive as well as usable in a tolerance-compensating way, at the same time ensuring the necessary fixing forces.

This object is achieved by the features of claim 1; advantageous realisations are subject matter of the subclaims.

The inventive fixture for external frames of solar modules on a supporting profile consists of a clamping-part support that is guidedly displaceable on the supporting profile in the longitudinal direction of the supporting profile and that is braceable with the supporting profile with the inclusion of a frame portion of the solar module and of a clamping part guided in the clamping-part support.

Because of the displaceability in the longitudinal direction of the supporting profile, assembly tolerances and tolerances of the supporting structure as well as variations in the dimensions of the solar modules can be compensated for in such a way that assembling is easy while at the same time maintaining the stability of the fixture.

One advantageous embodiment of the fixture provides that the guiding pair formed by the clamping-part support and the supporting profile consists of longitudinal webs of the supporting profile and noses or nose webs on side legs of the clamping-part support and that there is a rest of the clamping-part support on the supporting profile, wherein the longitudinal webs are preferably provided on the outside of the supporting profile and the noses or nose webs on the inside of the side legs, wherein both the longitudinal webs and the noses or nose webs should extend parallel to the longitudinal direction of the supporting profile in the assembled state.

A further advantageous realisation of the fixture provides that the lateral plane of the clamping-part support directed towards the face of the frame of the solar module is arranged at an angle $\alpha$ with respect to the face of the frame. This can be achieved if the clamping-part support has a rhomboidal cross-section in the side view. Displacements of the clamping part in the cross-sectional plane of the clamping-part support during bracing then make it possible to achieve an optimal rest or fit of the clamping part on the frame of the solar module.

In one advantageous embodiment, such a clamping part is designed as a double-angle section with legs that extend in opposite directions (Z-profile), wherein the upper leg reaches over the frame portion of the solar module and the lower leg is arranged guidedly vertically adjustably in the direction of displacement perpendicular to the longitudinal direction of the supporting profile in or on the clamping-part support.

The realisation of such a clamping part provides that for vertically adjusting the clamping part in the direction of displacement, a threaded bolt is rotatably arranged in an internal thread of the leg and is supported on the head part of the clamping-part support.

Of course, the arrangement can also be designed the other way round in that a threaded bolt is rotatably arranged in an internal thread of the head part and is supported on the leg.

In order to be able to turn the threaded bolt, it is preferred that the head part has a bore via which the threaded bolt is accessible.

A further realisation provides that for supporting the threaded bolt, the inside of the head part is designed as a cranked hollow rail for receiving the head of the threaded bolt.

A nut arranged in a cavity or in a groove of the leg or of the head part can serve as the internal thread of the leg or of the head part.

A further realisation of the fixture provides that the clamping-part support with the inserted clamping part is covered by a sleeve in the region of the side legs of the clamping-part support and of the web of the clamping part, which sleeve has the internal shape, and preferably also the external shape, of an oblique hollow rectangular parallelepiped, wherein the oblique angle of the sleeve corresponds to angle $\alpha$, wherein angle $\alpha$ is dimensioned such that a displacement of the clamping part within the clamping-part support during bracing results in an optimal end position of the web, i.e. in a position parallel to or almost parallel to the face of the frame. In the braced end position, the web then rests on the inside of the sleeve in the region opposite the lower Z-leg. Thus, all parts are braced with each other.

An exemplary embodiment of the component parts of the fixture is illustrated in the drawings in which FIG. 1 shows a clamping part with a frame portion of the solar module;

FIG. 2 shows a clamping-part support in two sections;

FIG. 3 shows a sleeve;

FIG. 4 shows a supporting profile;

Figure 5:
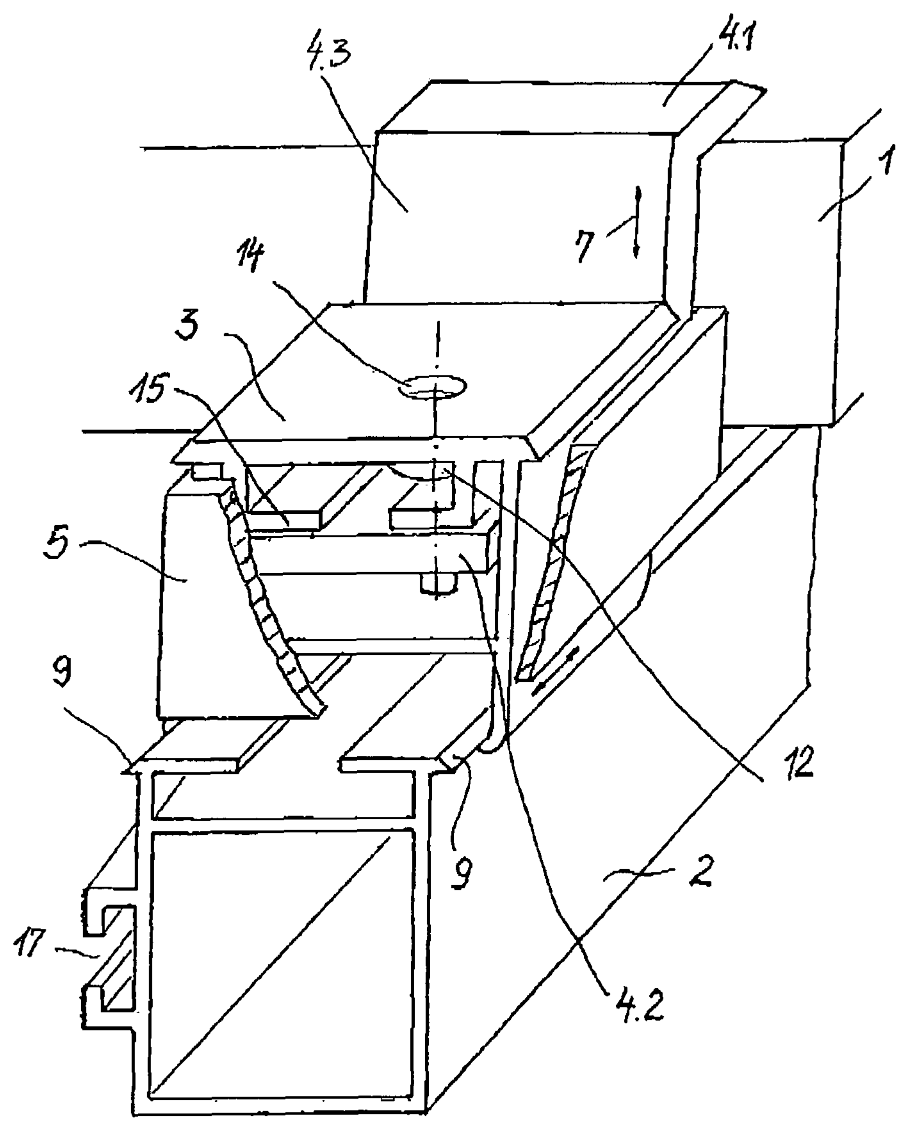
FIG. 5 shows the parts of FIGS. 1-4 in assembled condition.

FIG. 1 to FIG. 4 illustrate the component parts of the fixture for external frame portions 1 of solar modules on a supporting profile 2 consisting of a clamping-part support 3 that is guidedly displaceable on the supporting profile 2 in the longitudinal direction 8 of the supporting profile and that is braceable with the supporting profile 2 with the inclusion of a frame portion 1 of the solar module and of a clamping part 4 guided in the clamping-part support 3.

FIG. 1 shows the positioning of the clamping part 4 on the frame portion 1 of the solar module. The clamping part 4 is designed as a double-angle section with legs 4.1, 4.2 that extend in opposite directions, wherein the upper leg 4.1 reaches over the frame portion 1 of the solar module and the lower leg 4.2 is arranged guidedly vertically adjustably in the direction of displacement 7 in and on the clamping-part support 3. For vertically adjusting the clamping part 4 in the direction of displacement 7, a threaded bolt 12 is rotatably arranged in an internal thread of the leg 4.2 and is supported on the head part 13 of the clamping-part support 3 (FIG. 2). The internal thread of the leg 4.2 is formed by a nut arranged in a cavity (channel) of the leg with a through bore 4.2.

FIG. 2 shows the clamping-part support 3 that has a rhomboidal cross-section in the side view.

In detail, the clamping-part support 3 consists of a head part 13, two side legs 11 and a connection between the side legs 11 that serves as a rest 16 on the supporting profile 2. The lateral guiding pair 9, 10 formed by the clamping-part support 3 and the supporting profile 2 consists of longitudinal webs 9 of the supporting profile 2 (FIG. 4) and nose webs 10 on the side legs 11 of the clamping-part support 3.

The two lateral guiding pairs 9, 10 as well as the rest 16 ensure easy and stable displaceability in the longitudinal direction 8 of the supporting profile after the step of slipping or clicking the clamping-part support 3 on the supporting profile 2, and allow high tension force in the direction of displacement 7 of the clamping part 4. For bracing, the clamping part 4 is inserted into the clamping-part support 3 and guided between the side legs 11.

As mentioned in the explanation of FIG. 1 above, a threaded bolt 12 rotatably arranged in an internal thread of the leg 4.2 and supported on the head part 13 of the clamping-part support 3 serves to vertically adjust the clamping part 4 in the direction of displacement 7. For supporting the threaded bolt 12, the inside of the head part 13 is designed as a cranked hollow rail 15 for receiving the head of the threaded bolt 12. Further, the head part 13 has a bore 14 via which the head of the threaded bolt 12 is accessible and rotatable for bracing by means of a wrench.

Because of the rhomboidal cross-section of the clamping-part support 3, the face of the frame 1 of the solar module and the lateral plane of the clamping-part support 3 directed towards the face of the frame 1 enclose an angle $\alpha$. The result of this is that the clamping part 4 inserted in the clamping-part support 3 for bracing is also in an inclined position with respect to the face of the frame 1. This is intended because during bracing the clamping part 4 that is only laterally guided by the side legs 11 (guide surfaces 6) there is not only a displacement in the direction of displacement 7, but also, caused by the existing necessary play, a displacement towards the face of the frame 1. Therefore, angle $\alpha$ is dimensioned such that a displacement of the clamping part 4 within the clamping-part support 3 during bracing results in an end position of the web 4.3 that is essentially parallel to the face of the frame part 1. This adjusting and fixing geometry is even improved by a sleeve 5 (FIG. 3).

FIG. 3 shows a sleeve 5 that has the internal and the external shape of an oblique hollow rectangular parallelepiped. The oblique angle of the sleeve 5 corresponds to angle $\alpha$. By this sleeve 5, the clamping-part support 3 with the inserted clamping part 4 is covered in the region of the side legs 11 and of the web 4.3 before bracing, whereby the clamping part 4 is provided with an additional guide and a limitation with respect to the displacement towards the face of the frame 1.

In the braced end position, the web 4.3 rests on the inside of the sleeve 5 in the region opposite the leg 4.2. At the same time, the sleeve 5 covers the clamping-part support 3 on the visible side.

For assembly, the clamping-part support 3, the clamping part 4 with the threaded bolt 12, and the sleeve 5 are assembled to form an assembly unit. Even when assembly conditions are difficult, e.g. on a roof, these assembly units can be easily slipped or clicked on the supporting profile 2 (establishing the guiding pair 9, 10), be arranged with the leg 4.1 reaching over the frame portion 1, and be fixed by tightening the threaded bolt 12.

FIG. 4 shows a supporting profile 2 used for fixing that is preferably a hollow extruded Al-section with longitudinal webs 9 arranged at the top, to the side of the supporting surface 18 for the frame 1 of the solar module, said longitudinal webs 9 extending parallel to the longitudinal direction 8 of the supporting profile. The longitudinal webs 9 of the supporting profile 2 and the nose webs 10 of the side legs 11 of the clamping-part support 3 form one lateral guiding pair 9, 10 each between the clamping-part support 3 and the supporting profile 2. Further, the rest 16 of the clamping-part support 3 rests on the supporting surface 18 of the supporting profile 2.

The supporting profile 2 further has lateral connectors 17 for the roof fixture.

Apart from their above-mentioned high strength properties and the fact that they are easy to assemble, the parts used (supporting profile 2, clamping-part support 3, clamping part 4, and sleeve 5) are characterized in that they are based on extrudable Al-sections and can be manufactured solely by cutting the respective section into lengths. This manufacturing method is technologically very cost-effective.

Figure 6:
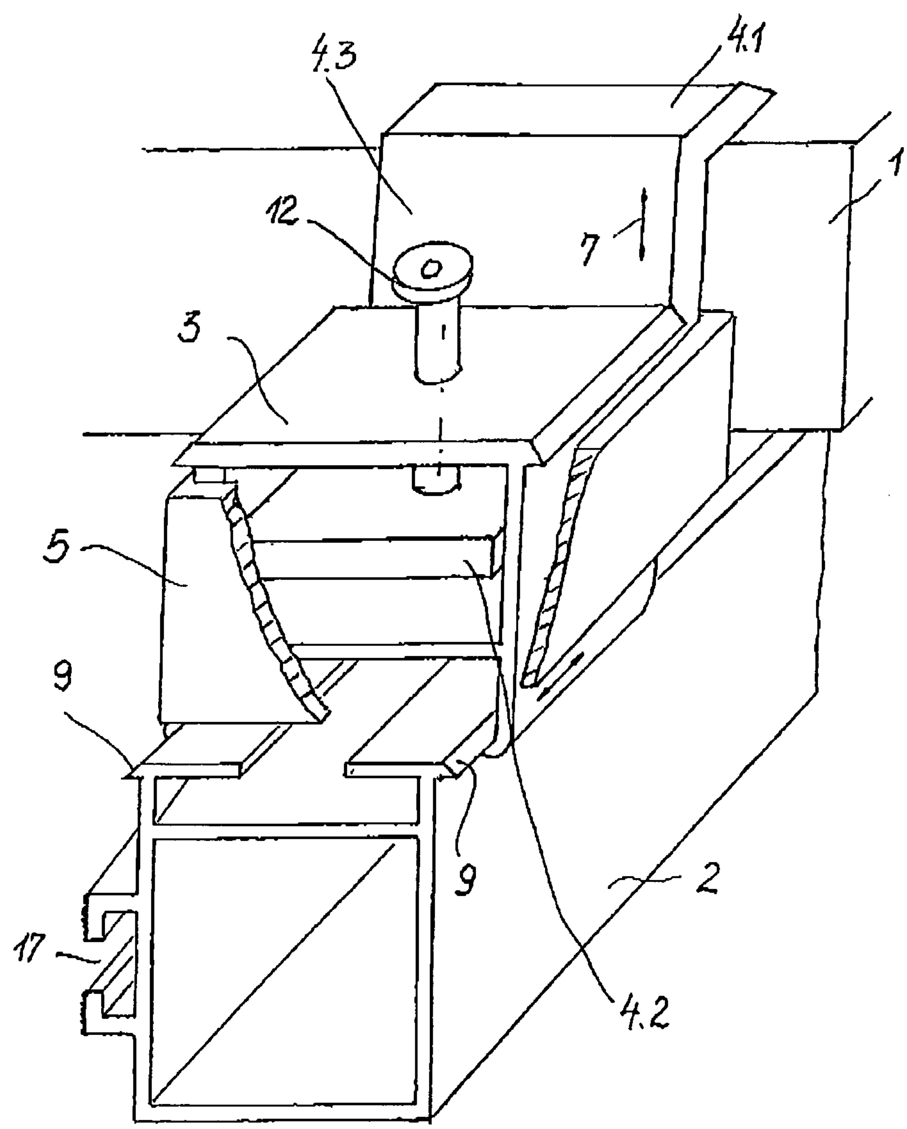
FIG. 6 shows the manner of vertical adjustment without the optional cranked hollow rail.

FIG. 5 shows the parts of FIGS. 1-4 in assembled condition and FIG. 6 shows the manner of vertical adjustment without the optional cranked hollow rail.

List of Reference Numerals

1 frame of solar module
2 supporting profile
3 clamping-part support
4 clamping part
4.1 leg
4.2 leg
4.3 web
5 sleeve
6 guide of clamping-part support
7 direction of displacement of clamping part 4
8 longitudinal direction of supporting profile
9 longitudinal webs
10 noses
11 side legs
12 threaded bolt
13 head part
14 bore in head part
15 cranked hollow rail
16 rest
17 connector for roof fixture
18 supporting surface

The invention claimed is:

1. A fixture for fixing external frames (1) of solar modules on a supporting profile (2), consisting of:

a clamping-part support (3) that is guidedly displaceable on the supporting profile (2) in the longitudinal direction (8) of the supporting profile and that is fixable to the supporting profile (2) to secure with the external frame (1) of the solar module in the longitudinal direction, a clamping part (4) guided in the clamping-part support (3) for securing the external frame (1) by clamping, and a sleeve (5) covering the clamping-part support (3) with the inserted clamping part (4) in the region of side legs (11) and of a web (4.3);

wherein a guiding pair (9,10) for guiding the clamping-part support (3) on the supporting profile (2) consists of longitudinal webs (9) on the outside of the supporting profile (2) and noses or nose webs (10) on the inside of the side legs (11).

2. The fixture according to claim 1, wherein a guiding pair (9, 10) for guiding the clamping-part support (3) on the supporting profile (2) consists of longitudinal webs (9) of the supporting profile (2) and noses or nose webs (10) on side legs (11) of the clamping-part support (3) and wherein there is a contact area (16, 18) wherein the clamping-part support (3) rests on the supporting profile (2).

3. The fixture according to claim 1, wherein there is a contact area (16, 18) wherein the clamping-part support (3) rests on the supporting profile (2).

4. The fixture according to claim 2, wherein the longitudinal webs (9) and the noses or nose webs (10) extend parallel to the longitudinal direction (8) of the supporting profile.

5. The fixture according to claim 1, wherein the clamping-part support (3) is inclined towards the face of the frame (1) of the solar module at an angle α with respect to the face of the frame (1).

6. The fixture according to claim 5, wherein the clamping-part support (3) has a rhomboidal cross-section in the side view.

7. The fixture according to claim 1, wherein the clamping part (4) is designed as a double-angle section with a web (4.3) and with upper and lower legs (4.1, 4.2) that extend in opposite directions, wherein the upper leg (4.1) reaches over the frame portion (1) of the solar module and the lower leg (4.2) is arranged adjustably in a direction of displacement (7) in and/or on the clamping-part support (3).

8. The fixture according to claim 7, wherein the clamping-part support (3) has a head part (13),and wherein for vertically adjusting the clamping part (4) in the direction of displacement (7), a threaded bolt (12) is rotatably arranged in an internal thread of the leg (4.2) and is supported on the head part (13) of the clamping-part support (3).

9. The fixture according to claim 7, wherein the clamping-part support (3) has a head part (13), and wherein for vertically adjusting the clamping part (4) in the direction of displacement (7), a threaded bolt (12) is rotatably arranged in an internal thread of the head part (13) and is supported on the lower leg (4.2).

10. The fixture according to claim 8, wherein the head part (13) has a bore (14) via which the threaded bolt (12) is accessible.

11. The fixture according to claim 8, wherein the inside of the head part (13) is designed as a cranked hollow rail (15) for receiving a head of the threaded bolt (12).

12. The fixture according to claim 8, wherein the internal thread of the leg (4.2) or of the head part (13) is formed by a nut arranged in a cavity or in a groove of the leg (4.2) or of the head part (13).

13. The fixture according to claim 1, wherein the sleeve (5) has the internal shape-of an oblique hollow rectangular parallelepiped.

14. The fixture according to claim 13, wherein the oblique angle of the sleeve (5) corresponds to angle α.

15. The fixture according to claim 6, wherein angle α is dimensioned such that a displacement of the clamping part (4) within the clamping-part support (3) during fixing results in an end position of the web (4.3) that is parallel to the face of the frame part (1).

16. The fixture according to claim 1, wherein in the braced end position, the web (4.3) rests on the inside of the sleeve (5) in the region opposite the leg (4.2).

17. The fixture according to claim 1, wherein the sleeve (5) has the internal shape and also the external shape of an oblique hollow rectangular parallelepiped.

* * * * *